Aug. 26, 1958   W. STELZER   2,848,877
BOOSTER BRAKE MECHANISM
Filed June 25, 1954
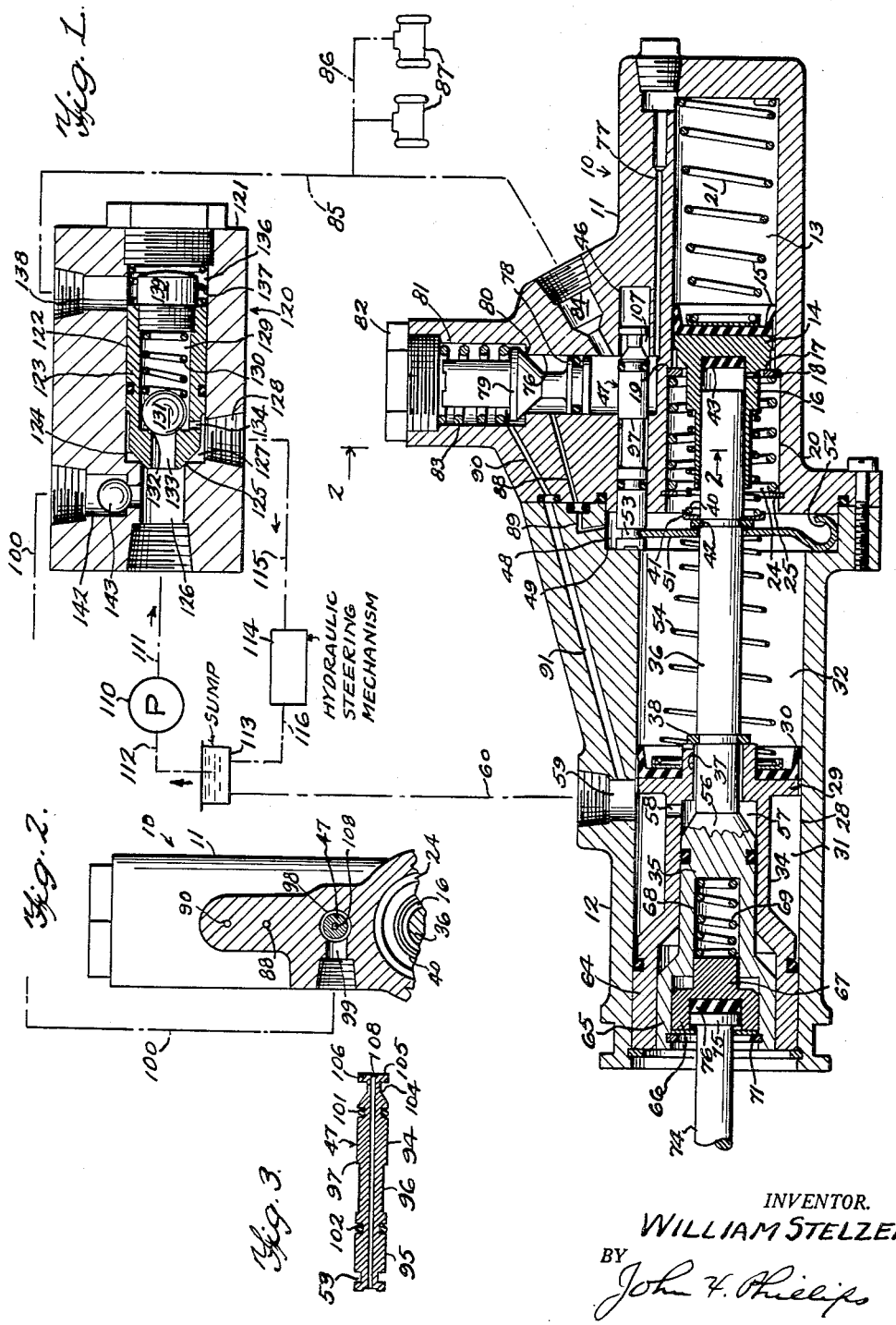
INVENTOR.
WILLIAM STELZER
BY
John F. Phillips
ATTORNEY United States Patent Office 2,848,877
Patented Aug. 26, 1958

2,848,877

BOOSTER BRAKE MECHANISM

William Stelzer, Summit, N. J.

Application June 25, 1954, Serial No. 439,331

14 Claims. (Cl. 60—54.6)

This invention relates to a booster brake mechanism, and more particularly to a two-stage master cylinder preferably using the steering booster oil pressure as a source of power.

An important object of the invention is to provide an apparatus which effectively applies the brakes in the event of a failure in power, which is especially important for booster mechanisms operated by low brake pedals.

A further object is to provide a two-stage brake booster of the type referred to wherein a small piston reacts on the foot pedal during normal operation to provide the pedal with "feel" and wherein a large piston, serving only in the event of a failure of power, transmits a large volume of fluid to the wheel cylinders to set the brakes.

A further object is to provide in an apparatus of this character a spring cushion in the manually operated connections to eliminate unpleasant feel or "lump" during the change from the first stage to the second stage of operation while a failure in power exists.

A further object is to provide an apparatus of this character wherein application of the brakes by the pedal in the event of a power failure is not disturbed by the application of power when the hydraulic pump for the steering mechanism becomes operative during the brake application.

Other objects and advantages of the invention will become apparent during the course of the following description.

In the drawing I have shown one embodiment of the invention. In this showing:

Figure 1 is an axial sectional view through the booster mechanism showing also in section a throttle valve used in conjunction with the apparatus, the wheel cylinders, and the pump, sump and hydraulic steering mechanism associated therewith being diagrammatically illustrated;

Figure 2 is a detail fragmentary sectional view on line 2—2 of Figure 1; and

Figure 3 is a detail axial sectional view through the control valve.

Referring to Figure 1, the numeral 10 designates a master cylinder as a whole comprising a pair of cylinder bodies indicated as a whole by the respective numerals 11 and 12.

The body 11 is provided therein with a cylindrical bore 13, forming one master cylinder space, and a piston 14 is slidable in such cylinder and is provided with a lipped seal 15 which prevents flow of hydraulic fluid from the bore or cylinder 13 to the left past the piston 14, but which permits flow of hydraulic fluid in the opposite direction under conditions to be described. The piston 14 is provided with an axially extending sleeve 16, shouldered as at 17 for engagement with a ring 18 normally engaging a shoulder 19 formed at the left-hand end of the cylinder 13 as viewed in Figure 1. The ring 18 is slidable in a larger cylinder 20, coaxial with the cylinder 13. A return spring 21 in the cylinder 13 urges the piston 14 to the off position shown.

A spring 24 is arranged in the cylinder 20. This spring engages at one end against the ring 18 and at its opposite end against a snap ring 25, and it will be apparent that the spring 24 urges the ring 18 to its off position shown in Figure 1 when the apparatus is not operating.

The body 12 is provided with a cylindrical bore 28 in which is arranged a piston 29 provided with a lipped seal 30 and dividing the bore 28 to form a pair of chambers 31 and 32. The seal 30 prevents flow of fluid past the piston 29 from chamber 32 to chamber 31 but permits flow of fluid in the opposite direction.

The piston 29 is provided within the chamber 31 with a sleeve portion 34 in which is slidable a piston 35 carrying a piston rod 36 extending loosely through an opening 37 in the right-hand end of the piston 29 as viewed in Figure 1. A snap ring 38 limits movement of the rod 36 to the left relative to the piston 29, to the off position shown in Figure 1.

The rod 36 has its free end slidable in the sleeve portion 16 of the piston 14. A spring 40 has one end engaging the sleeve portion 16 and has its other end engaging a seat 41 backed up by a snap ring 42 carried by the rod 36. The spring 40 accordingly urges the rod 36 to its off position shown. Within the end of the interior of the sleeve portion 16 is arranged a resilient cushion 43 engageable under certain conditions by the rod 36, but the end of such rod is normally spaced from the cushion 43 as shown in Figure 1.

Parallel to the axis of the master cylinder, the body 11 is provided with a bore 46 in which is arranged a valve indicated as a whole by the numeral 47 and further described below. The body 12, in the face thereof adjacent the body 11, is provided with an annular recess 48 forming a shoulder 49 against which seats one end of the valve 47 when the latter is in its off position shown in Figure 1. A valve operating lever 51 straddles the rod 36 and has one end looped as at 52 to rock in the bottom of the recess 48 as viewed in Figure 1. The upper end of the lever 51 engages in a groove 53 in the valve 47 to impart movement thereto as described below. A coiled spring 54 seats at one end against the piston 29 and at its other end against the lever 51 to tend to hold the latter against the snap ring 42, thus tending normally to hold the lever 51 and valve 47 in their normal off positions.

As will be further noted below, the spring 54 is somewhat weaker than the spring 24.

The piston 35 has its inner end tapered to form a valve end 56 normally spaced from but engageable with the adjacent end of the opening 37. To the right of the piston 35, a chamber 57 is formed in the piston sleeve 34 and is in fixed communication with the chamber 31 through a port 58. The chamber 31 is in constant communication through a port 59 with a hydraulic fluid line 60, further referred to below.

The left-hand end of the piston sleeve 34 is enlarged as at 64 to slidably receive the enlarged end 65 of the valve 35, and within the sleeve portion 65 is slidable a head 66 having a reduced end 67 slidable in a bore 68 formed in the valve 35. A cushion spring 69 is arranged in this bore to resiliently oppose movement of the head 66 toward the right from its normal off position shown in Figure 1. The head 66 is movable relative to the valve 35 solely against the compression of the spring 69, within the limits of the space at the right-hand side of the head 66. Movement of this head to the left is limited by a snap ring 71.

A push rod 74 is provided with a head 75 extending into a head 66 and preferably engaging the cushion 76 within such head. The push rod 74 is mechanically connected in any suitable manner to the vehicle brake pedal (not shown), and the rod 74 may be considered to be the manually operable element for imparting movement to the parts of the apparatus as further described below, in order to effect application of the vehicle brakes.

The body 11 is provided with a bore 76 transverse to and communicating with the bore 46 as shown in Figure 1. At its inner end, the bore 76 communicates through a passage 77 with the right-hand end of the master cylinder 13 as viewed in Figure 1. A sealed piston 78 is slidable in the bore 76 and carries thereabove a valve 79 engageable with a seat 80 formed at the lower end of a bore 81 of larger diameter than and extending above the bore 76. The bore 81 is closed at its upper end by a cap 82, and a spring 83 is interposed between this cap and the valve 79 to normally hold the latter seated as shown in Figure 1.

The valve seat 80 limits downward movement of the valve 79 and piston 78. The space within the bore 76 below the piston 78 communicates through a port 84 with a hydraulic fluid line 85 having branches 86 leading to the wheel cylinders of the vehicle, two of which have been illustrated and indicated by the numeral 87.

Between the piston 78 and valve 79, a restricted passage 88 is drilled through the body 11. The other end of this passage communicates with the recess 48 through passages 89 in the body 12. The body 11 is provided with a similar restricted passage 90 communicating at one end with the bore 81 and at its opposite end with a passage 91 in the body 12, the latter passage communicating with the port 59.

The valve 47 is provided with a head 94 (Figure 3) toward one end of the valve. Toward its other end, the valve is provided with another relatively long head or land 95 in which the groove 53 is formed. Intermediate these heads the valve is reduced as at 96, and the left-hand end of the head 94 accordingly forms a shoulder 97 which, in the normal off positions of the parts, is arranged slightly to the left of the left-hand limit of the bore 76 to disconnect the lower end of this bore from the space around the valve shank 96. The space around such shank is indicated in Figure 2 by the numeral 98, and this space is in fixed communication through a lateral port 99 with a fluid line 100, further referred to below.

The valve heads 94 and 95 are preferably provided with O-rings 101 and 102, the latter of which seals the valve against leakage between the recess 48 and the inner end of the bore 76. The O-ring 101 seals against leakage between the lower end of the bore 76 and the right-hand end of the bore 46 when the O-ring 101 is moved into such bore end under conditions to be described.

The valve 47, to the right of the head 94 as viewed in Figures 1 and 3, is reduced as at 104, and the extremity of the valve adjacent such reduced portion is provided with a small head 105 notched at one side as at 106 (Figure 3) to provide for communication between the right-hand end of the bore 46 and the space 107 between the heads 94 and 105. The space 107 communicates with the passage 77 when the valve is in the off position shown in Figure 1. The valve 47 is provided with an axial passage 108 extending therethrough, and such passage is always in communication at one end with the right-hand end of the bore 46 and at its other end with the chamber 32.

The present apparatus is particularly intended to utilize the hydraulic system of a power steering mechanism as its source of power. Such a system has been diagrammatically illustrated in Figure 1. The system comprises a pump 110 having a discharge line 111 and a return or inlet line 112, the other end of which is connected to a sump 113. In the manner to be described, the pump 110 circulates hydraulic fluid to the power steering mechanism, diagrammatically indicated at 114, through a pipe 115, and a line 116 leads from the mechanism 114 back to the sump 113. The line 60 also is connected to the sump as shown, to return hydraulic fluid from the present apparatus to the sump.

A throttle valve mechanism indicated as a whole by the numeral 120 is employed for controlling pressures in the brake system. The throttle valve mechanism comprises a body 121 having a bore 122 therein in which is slidable a valve element 123 having at one end a valve 124 engageable with a seat 125 opening into a port 126 to which the line 111 is connected. The end of the valve element 123 adjacent the valve 124 is reduced to provide a space 127 in communication with a port 128 to which a pipe 115 is connected.

The valve element 123 is provided with a bore 129 in which is arranged a spring 130 engaging a ball valve 131 to tend to maintain such valve against a seat 132 controlling a passage 133 leading into the port 126. The valve element 123 is ported as at 134 for the flow of fluid from the passage 133 into the space 127 and into the line 115 when the valve 131 is opened in the manner to be described.

At the right-hand end of the valve element 123 a space or chamber 136 is formed in the bore 122, and in this space is arranged a spring 137 engaging the valve element 123 to normally maintain the valve 124 seated. The space 136 is in fixed communication with a port 138 to which is connected the line 85. The spring 130 engages at its right-hand end against a plug 139 which forms in effect a part of the end of the valve element 123 so that the entire area of this valve element at the right-hand side thereof is affected by hydraulic pressure in the space 136 for a purpose to be described.

The body 121 is provided with a lateral port 142 to which is connected one end of the line 100, this line leading to the port 99 (Figure 2) as previously stated. Communication between the port 142 and the passage 126 is controlled by a check valve 143 opening away from the port 126, as will be obvious.

Operation

The apparatus derives its power preferably from the hydraulic pressure generated by the pump used with a hydraulic steering mechanism. When the brake is not in operation, no pressure will be present in the chamber 136 of the throttle valve 120. Accordingly, the pump 110 circulates fluid through line 111, port 126, past valve 124, which is free to open opposed only by the tension of the spring 137, through port 128 and line 115, thence through the hydraulic steering mechanism 114 and back to the sump 113 through line 116, the pump intake line 112 supplying hydraulic fluid from the sump to the intake side of the pump 110.

The parts of the brake mechanism normally occupy the positions shown in Figure 1. When the brake is to be operated, the brake pedal (not shown) is depressed to move the rod 74 to the right. There being no opposition to movement of the rod 36 except for the light spring 40, movement of the rod 74 will be transmitted to the rod 36 through spring 69. This movement rocks the valve lever 51 about its lower end as viewed in Figure 1, and the upper end of the lever moves the valve 47 to the right so that the shoulder 97 moves past the left-hand limit of the bore 76.

Fluid from the pump 110 will now flow from port 126 past check valve 143 and into the line 100, and from this line (Figure 2) hydraulic fluid flows into the space 98 around the stem 96 of the valve 47. This fluid flows into the bore 76 beneath the piston 78, thence through port 84 through lines 85 and 86, and thus into the wheel cylinders 87. Fluid also flows into the chamber 136 of the throttle valve through line 85, and hydraulic pressure in the chamber 136, acting on the adjacent end of the valve element 123 tends to hold the valve 124 on its seat 125. This provides, through line 100, etc., suitable pressure for operating the brakes, since the valve 124 has its opening movement resistant to a substantially greater extent than when the brake mechanism is not operating. However, excessive pressure cannot be built up in the port 126 of the throttle valve since, at a predetermined pressure, the ball valve 131 will open permitting the flow of fluid through port 134 and line 115 to the steering mechanism. Accordingly, ample hydraulic pressure for operating the brakes is provided while maintaining an adequate flow of hydraulic fluid through the steering mechanism. The brake mechanism does not substantially reduce the flow of fluid through the steering mechanism since the quantity of fluid used for operating the brake is not sufficient to affect pressures utilized for operating the steering mechanism.

When the valve 47 is moved in the manner described, the O-ring 101 enters the right-hand end of the bore 46 and seals the space 107 from the lower end of the bore 76. Thus fluid is prevented from flowing from passage 84 into the right-hand end of the bore 46 and thence through the passage 108.

The lower end of the bore 76 (Figure 1) is in constant communication with the master cylinder 13 through passage 77. Accordingly, whatever pressure is delivered to the wheel cylinders upon operation of the valve 47 will be duplicated in the cylinder 13. Pressure in the chamber 13 acts against the piston 14 to provide the brake pedal with "feel" except in the initial movement before the brake shoes are in contact with the drums, during which time the spring 24 holds the piston 14 in the position shown in Figure 1. A higher pressure in the wheel cylinders, and accordingly in the cylinder 13, causes the piston 14 to move to the left in Figure 1 to engage the pad 43 with the adjacent end of the rod 36 to transmit reaction forces to the brake pedal proportional to the pressures which are applying the brakes.

The valve 79 opens under conditions to be described. While this valve is closed, the piston 14 and rod 36 move only a sufficient distance to operate the valve 47. After a predetermined braking pressure is built up, hydraulic pressure beneath the piston 78 moves this piston upwardly to open the valve 79 against the tension of the spring 83. The relief valve 131 of the throttle valve prevents a building-up of pressure in the port 126 beyond a predetermined pressure which must be higher than the pressure at which the bypass valve 79 opens. After the spring 83 yields to hydraulic pressure beneath the piston 78, there can be no further increase in fluid pressure in the chamber 13 because of movement of the valve 47. Opening movement of the valve 79, as described, affords communication between the restricted passages 88 and 90 for the flow of hydraulic liquid from the chamber 32 through the passages 89, 88, 90 and 91 to the port 59 and thence back to the sump 113 through line 60.

Further depression of the brake pedal then causes rod 36 to advance, carrying with it the piston 14. This additional movement of the rod 36 closes the valve 56, thus disconnecting chambers 31 and 32 from each other. The seating of the valve 56 causes the rod 36 to carry with it the low pressure piston 29. This movement of the piston 29 displaces fluid from the chamber 32 back to the sump in the manner described. No noticeable reaction changes occur through the brake pedal during this operation, since the brakes have already been set and the reaction ratio through the piston 14 remains the same. No braking forces are generated by fluid from the chamber 32 since, in the normal operation of the apparatus as just described, this chamber is open to the sump for the free flow of fluid thereto.

As previously stated, the operation referred to takes place with little movement of the piston 14 and rod 36. However, as the operator continues to exert pressure on the pedal, the piston 14 is advanced to increase pressure in the master cylinder 13 to subject the brake cylinders 87 to increased brake applying pressure. The piston 14 is of relatively small diameter and, accordingly, substantial pressure is generated by foot pressure against the pedal. Thus the operator by foot pressure may generate in the brake cylinders a pressure higher than that which is available from the pump 110. When such higher pressure is generated in the chamber 13, the pressure reacts through passage 77, through the bottom of the bore 76 into space 98 (Figure 2), thence through line 100 to seat the ball valve 143 against the lower pump pressure.

When the brakes are to be released, the brake pedal is released by the operator's foot and upon retractile movement of the rod 74, fluid from the wheel cylinders flows into the chamber 13 to return the piston 14 to the position shown in Figure 1. Pressure in the wheel cylinders, accordingly, drops to the pressure existing in the chamber 136 of the throttle valve. By a further releasing of the brake pedal, the lever 51 will be returned to the normal position shown in Figure 1, carrying with it the valve 47 to restore the latter to normal position. This operation opens the chamber 13 to the space 107 around the right-hand end of the valve 47 as viewed in Figure 1. This space communicates through notch 106 (Figure 3) with the right-hand end of the bore 46, thence through the axial passage 108 of the valve to the cylinder 32. With the rod 36 in the off position, the chamber 32 communicates through opening 37, chamber 57, port 58, chamber 31 and port 59 with the sump 113 through the return line 60. Thus pressure is relieved in the master cylinder 13 and fluid returns to the sump 113. Accordingly, the brakes will be fully released. Of course, the spring 40 will have moved the rod 36 and piston 35 to the off position shown, the spring 40 being stronger than and overruling the spring 54.

In the event of a failure of power, as when the pump 110 is not running, actuation of the rod 74 causes the valve 56 to pick up the piston 29 to move it toward the right in Figure 1, the passage through opening 37 thus being closed and fluid being trapped in the cylinder 32. This fluid will be transmitted to the chamber 13 by escaping past the lip of the cup 15, this cup or seal permitting such flow of hydraulic fluid as previously stated. The piston 29 being of substantially greater area than the piston 14, the manual operation, without power, in the manner referred to displaces a substantial volume of fluid into the chamber 13, thence through line 77, bore 76 and lines 85 and 86 into the brake cylinders to move the brake shoes into engagement with the drums.

After the brakes are thus set, pressure in the lower end of the bore 76 moves the piston 78 upwardly, whereupon fluid can flow from cylinder 32 through restricted passages 89, 88, 90 and 91 back to the sump 113 through port 59 and line 60. The large volumetric displacement of the piston 29, therefore, is effective for setting the brakes, and after this piston has served its purpose, it is relieved of the performance of any further duty. During this operation, the pressure drop between the bore 76, beneath the valve 79, and the passage 90 is gradually decreased because of the increasing pressure acting upwardly on the piston 78. This causes a softening of the pedal or a change in reaction ratio which is satisfactory for the emergency operation being considered. This operation makes the driver aware that the operation is not normal, and under such conditions perfect feel is less important than the effectiveness of the brakes.

If more braking action is then desired, further depression of the brake pedal will move the piston 14 in the chamber 13, thus increasing the pressure in the brake cylinders through passage 77, the lower end of the bore 76 and the lines 85 and 86. Thus the piston 29, in a manual brake application, displaces the relatively large volume of fluid necessary to set the brakes, whereupon the substantially smaller piston 14 generates whatever braking action is necessary.

In order to prevent premature opening of the valve 79 when the brake pedal is depressed violently, passages 88 and 90 are restricted, thus causing a high resistance to a rapid fluid flow. The spring 69 is preferably of such strength as to yield about when the valve 79 opens. A sudden forward movement of the rod 36 occurs in a fast brake application, and pressure in the chamber 32 decreases due to the opening of the valve 79, but such decrease in pressure is not particularly noticeable to the operator since the spring 69 serves to maintain a relatively uniform reaction against the brake pedal.

In another aspect of the operation and assuming that the master cylinder is in its second stage of operation with the piston 14 slightly advanced from its off position and no power is available, it will be apparent that if the steering booster then comes into operation, a high pressure will be developed in the line 100. This pressure would be communicated to the wheel cylinders the same as in a normal operation and the chamber 13 would be subjected to the same pressure. However, this would simply cause the piston 14 to yield until the valve 47 shuts off and relieves the pressure.

From the foregoing it will be apparent that the present construction is particularly useful for operation by hydraulic pressure available where power steering mechanisms are employed, and that the apparatus is especially useful in connection with low brake pedals in the event of a failure of power. The small piston 14 is effective in normal operation to provide the brake pedal with accurate "feel" and the larger piston 29 functions only in the event of a failure of power to transmit a large volume of fluid to the wheel cylinders to set the brakes. The spring cushion in the manually operated elements, namely the spring 69, eliminates any unpleasant feel or "lump" during the change from the first stage to the second stage during a failure of power for the apparatus.

It is to be understood that the form of the invention illustrated is to be taken as a preferred example of the same and that the scope of the invention is defined in the appended claims.

I claim:

1. A booster brake mechanism for a brake system having wheel cylinders, comprising a source of hydraulic pressure, a pair of cylinders of different diameters having fluid connection with the wheel cylinders, a small piston in the smaller cylinder and a large piston in the larger cylinder, manual means connected for effecting movement of said pistons to displace hydraulic fluid from said cylinders, a valve connected to normally cut off communication between said source and the wheel cylinders and being connected to be moved by movement of said manual means from a normal off position to connect said source to the wheel cylinders, said smaller cylinder communicating with the wheel cylinders to be subject to pressure therein to proportionately react against said manual means, control means connected to be responsive to pressure in said source when said valve is operated to return fluid from the larger cylinder to said source to render said larger cylinder inoperative when pressure is present in said source, and means connected to be operative when pressure in said larger cylinder is higher than pressure in said smaller cylinder to bypass fluid from the former to the latter upon a failure of power in said source.

2. Apparatus in accordance with claim 1 wherein said smaller piston is constructed to bypass fluid from said larger cylinder to said smaller cylinder when pressure in the former is higher than in the latter, said control means being interposed between said smaller cylinder and the wheel cylinders and connected to be operative by the pressure of fluid bypassed from said larger cylinder to said smaller cylinder upon a failure of power in said source, to release fluid from said larger cylinder when the bypassed fluid affecting said control means reaches a predetermined pressure.

3. A booster brake mechanism for a brake system having wheel cylinders, comprising a source of hydraulic pressure having a low pressure intake, a pair of cylinders of different diameters filled with hydraulic fluid, a small piston in the smaller cylinder, a large piston in the larger cylinder, a rod connected to be movable in one direction to move said pistons and normally occupying an off position in which it has lost motion connection with both pistons, manually operable means connected for moving said rod away from its off position, passage means connecting the smaller cylinder to the vehicle wheel cylinders, a valve, a space in communication with said source and connected to be controlled by said valve, said valve occupying a normal off position disconnecting said space from said passage means and connected to be movable to open position to connect said space to said passage means by initial movement of said rod from its normal off position, whereby, before moving said pistons, said rod will open said valve, control means connected to be responsive to the building up of a predetermined pressure in said passage means for connecting said larger cylinder to said intake, and means connected to be operative when pressure in said larger cylinder is higher than pressure in said smaller cylinder incident to movement of said pistons upon a failure of power in said source for bypassing hydraulic fluid from said larger cylinder to said smaller cylinder for the flow of such fluid through said passage means to the brake cylinders.

4. An apparatus according to claim 3 wherein said passage means comprises a bore, said control means comprising a piston in such bore subject to pressures therein, and a valve connected to said piston and controlling communication between said larger cylinder and said intake.

5. Apparatus according to claim 3 wherein the means for bypassing fluid from said larger cylinder to said smaller cylinder comprises a lipped seal carried by said small piston and seating when the pressure in said smaller cylinder is at least as high as the pressure in said larger cylinder, the lip of said seal contracting when the pressure in said larger cylinder is higher than the pressure in said smaller cylinder to bypass fluid from the former to the latter.

6. A booster brake mechanism for a braking system having wheel cylinders, comprising a hydraulic pump having an outlet line and an inlet line, a sump connected to the inlet line, a pair of alined cylinders of different diameters, a small piston in the smaller cylinder, a large piston in the larger cylinder, a bore communicating with said smaller cylinder, passage means connecting one end of said bore to the vehicle wheel cylinders, a valve having a reduced portion forming a space therearound communicating with the outlet line of said pump, said valve having a land at one end of said reduced portion normally occupying a position in which it is connected to close communication between said space and said end of said bore, common operating means connected to be movable from a normal off position to first move said valve to open said space to said end of said bore and then transmit movement to said pistons, control means in said bore connected to be responsive to a predetermined hydraulic pressure in said end thereof for connecting said larger cylinder to said sump, and means connected to be operative when the pressure in said larger cylinder is higher than pressure in said smaller cylinder for bypassing fluid from the former to the latter to supply hydraulic fluid pressure to said end of said bore and through said passage means to the wheel cylinders to apply the brakes.

7. Apparatus according to claim 6 wherein the means for bypassing fluid from said larger cylinder to said smaller cylinder comprises a lipped seal carried by said smaller piston and contractable for the flow of fluid from the larger cylinder to the smaller cylinder when pressure in the former is higher than pressure in the latter, the pressure of the bypassed fluid, upon a failure of power in said pump, operating said control means when such fluid reaches said predetermined pressure to connect said larger cylinder to said sump, whereupon movement of said small piston displaces additional fluid from said smaller cylinder to generate higher pressures in the brake cylinders.

8. Apparatus according to claim 6 provided with a check valve in said outlet line closing toward said pump whereby communication between said end of said bore through the outlet line of said pump is closed when said small piston, moving in said smaller cylinder, generates a hydraulic pressure higher than the outlet pressure of said pump.

9. Apparatus according to claim 6 provided with manual means connected for moving said common operating means, and a cushion spring interposed between and engaging said manual means and said common operating means to cushion hydraulic pressure reactions imparted to said common operating means.

10. A booster brake mechanism for a brake system having wheel cylinders, comprising a hydraulic pump having an outlet line and an inlet line, a sump connected to said inlet line, a pair of alined cylinders of different diameters, a small piston in the smaller cylinder, a large piston in the larger cylinder, an operating rod connected for operating said pistons and normally occupying an off position in which it has lost motion connection with said pistons to be moved an appreciable distance from said off position before imparting movement to said pistons, a manually operable element connected for effecting movement of said rod, a bore having one end communicating with the smaller cylinder, passage means connecting said end of said bore with the wheel cylinders, a slide valve having a reduced portion forming a space communicating with the outlet line of said pump, said valve having a land adjacent said reduced portion arranged to normally close communication between said space and said end of said bore, a lever engaging said rod end having one end engaging said valve, spring means connected to bias said lever to move said valve to open said space to said end of said bore, stronger spring means engaging said operating rod and normally holding said lever in a position in which said valve is in its normal position, said stronger spring means being overcome by movement of said operating rod whereby said first-named spring means moves said valve to open said space to said end of said bore, means connected to be responsive to predetermined hydraulic pressure in said end of said bore for connecting said larger cylinder to said sump, and means connected for bypassing fluid from said larger cylinder to said smaller cylinder when pressure in said larger cylinder exceeds pressure in said smaller cylinder.

11. Apparatus according to claim 10 wherein said valve is operable in a valve bore having one end communicating with said end of said first-named bore when said valve is in normal position and closed to communication therewith when said valve is moved from its normal position, said valve having an axial passage therethrough affording constant communication between said end of said valve bore and said larger cylinder for the return flow of fluid from said passage means and said smaller cylinder through said axial bore to said larger cylinder when said valve returns to its normal position, and means connected to afford communication between said larger cylinder and said sump when said operating rod is in its off position.

12. Apparatus according to claim 10 provided with a check valve in said pump outlet line closing toward said pump, such check valve closing when movement of said operating rod causes said small piston to generate in said smaller cylinder a pressure higher than the outlet pressure of said pump.

13. Apparatus according to claim 10 wherein said valve is operable in a valve bore having one end communicating with said end of said first-named bore when said valve is in normal position and closed to communication therewith when said valve is moved from its normal position, said valve having an axial passage therethrough affording constant communication between said end of said valve bore and said larger cylinder for the return flow of fluid from said passage means and said smaller cylinder through said axial bore to said larger cylinder when said valve returns to its normal position, means connected to afford communication between said larger cylinder and said sump when said operating rod is in its off position, and a check valve in the outlet line of said pump closing toward said pump and movable to closed position to disconnect said outlet line from said valve space when manual operation of said small piston generates in said smaller cylinder a pressure exceeding the outlet pressure of said pump.

14. Apparatus according to claim 10 provided with a valve bore in which said valve is movable, said valve bore having an end communicating with said end of said first-named bore when said valve is in its normal position and being closed to communication therewith when said valve is moved from normal position, said valve being provided with an axial passage therethrough communicating at one end with said end of said valve bore and at its opposite end with said larger cylinder, said large piston having a chamber therein communicating with said sump and communicating with said larger cylinder when said operating rod is in its off position, said operating rod having a valve engaging said larger piston upon predetermined movement of said rod from its off position to close communication between such chamber and said larger cylinder and to impart movement to said large piston.

References Cited in the file of this patent

UNITED STATES PATENTS

| | | |
|---|---|---|
| 1,846,089 | Davis | Feb. 23, 1932 |
| 1,890,010 | Vickers | Dec. 6, 1933 |